(12) United States Patent
Katoh et al.

(10) Patent No.: US 7,047,726 B2
(45) Date of Patent: May 23, 2006

(54) METHOD OF PURIFYING EXHAUST GAS OF AN INTERNAL COMBUSTION ENGINE

(75) Inventors: Kenji Katoh, Suntou-gun (JP); Shinji Tsuji, Okazaki (JP); Masaru Kakinohana, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/644,869

(22) Filed: Aug. 21, 2003

(65) Prior Publication Data

US 2004/0065076 A1    Apr. 8, 2004

(30) Foreign Application Priority Data

Aug. 26, 2002    (JP) .............................. 2002-245668

(51) Int. Cl.
*F01N 3/00*    (2006.01)
(52) U.S. Cl. ............................. 60/274; 60/276; 60/295; 60/301; 60/286
(58) Field of Classification Search ................ 60/274, 60/295, 297, 301, 303, 276, 285, 286; 44/358, 44/359, 361, 366
See application file for complete search history.

(56) References Cited

U.S. PATENT DOCUMENTS

| | | |
|---|---|---|
| 5,792,436 A | 8/1998 | Feeley et al. |
| 6,200,358 B1 * | 3/2001 | Fleischer et al. .............. 44/300 |
| 6,629,407 B1 * | 10/2003 | Roos et al. .................... 60/274 |
| 6,684,627 B1 * | 2/2004 | Mizuno et al. ................ 60/274 |

FOREIGN PATENT DOCUMENTS

| | | |
|---|---|---|
| EP | 0 582 917 A1 | 2/1994 |
| EP | 0 815 925 A1 | 1/1998 |
| EP | 0 891 806 A2 | 1/1999 |
| JP | A-48-44618 | 6/1973 |
| JP | A-05-125372 | 5/1993 |
| JP | A-2000-027712 | 1/2000 |
| JP | B2 3154105 | 2/2001 |
| JP | A 2002-47956 | 2/2002 |

\* cited by examiner

Primary Examiner—Thomas Denion
Assistant Examiner—Diem Tran
(74) Attorney, Agent, or Firm—Oliff & Berridge, PLC

(57) ABSTRACT

A NOx occluding and reducing catalyst 20 is provided in an exhaust gas passage of an engine to occlude the NOx in the exhaust gas of a lean air-fuel ratio. The engine is provided with an injector for directly injecting the fuel into the combustion chamber, and the fuel fed by a fuel pump into a common rail with pressure is injected. The additive containing a sulfur-solidifying agent that forms a solid sulfate upon the reaction with sulfur in the fuel due to combustion, is injected into the common rail from a tank due to a pump, and is supplied into the combustion chamber through the injector together with the fuel. When the condition of the atmosphere of the NOx occluding and reducing catalyst is the one where the NOx in the exhaust gas is little absorbed, the ECU adjusts the discharge amount of the pump, and decreases the amount of the additive injected into the common rail or interrupts the injection. This decreases the consumption of the sulfur-solidifying agent.

16 Claims, 13 Drawing Sheets

METHOD OF PURIFYING EXHAUST GAS OF AN INTERNAL COMBUSTION ENGINE

BACKGROUND OF THE INVENTION

1. Field of the Invention

The present invention relates to a method of purifying the exhaust gas of internal combustion engines and, more specifically, to a method of purifying the exhaust gas by using a NOx occluding and reducing catalyst.

2. Description of the Related Art

There is known a method of purifying the exhaust gas of an internal combustion engine by disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio, and by causing the NOx occluding and reducing catalyst to occlude the NOx in the exhaust gas from the engine when the engine is operated at a lean air-fuel ratio, and purifying the NOx occluded by the NOx occluding and reducing catalyst by reduction with reducing components in the exhaust gas from the engine when the engine is operated at the stoichiometric air-fuel ratio or at the rich air-fuel ratio.

In the method of purifying exhaust gas by using the NOx occluding and reducing catalyst, a problem often arises in regard to a drop in the NOx purifying capability of the NOx occluding and reducing catalyst due to the occlusion of sulfur in the fuel, i.e., sulfur contamination. Fuel such as gasoline or diesel oil contains sulfur in small amounts and, hence, trace amounts of SOx (sulfur oxides such as $SO_2$, $SO_3$, etc.) are contained in the exhaust gas after the combustion. The SOx in the exhaust gas is occluded by the NOx occluding and reducing catalyst based on the same mechanism as for the NOx. However, once occluded, the SOx is not released from the NOx occluding and reducing catalyst under a temperature condition where the NOx occluded by the NOx occluding and reducing catalyst can be purified by reduction.

When the exhaust gas contains SOx, therefore, the amount of SOx occluded by the NOx occluding and reducing catalyst gradually increases after the repetition of occlusion and reduction of NOx, and the amount of NOx that can be occluded decreases by an amount of the SOx that is occluded. Namely, the SOx causes a decrease in the NOx occluding capability or NOx purifying capability of the NOx occluding and reducing catalyst, i.e., the so-called sulfur contamination (or S contamination) occurs.

Once the sulfur contamination takes place on the NOx occluding and reducing catalyst, the NOx purifying capability must be recovered by carrying out the operation at a rich air-fuel ratio while elevating the catalyst temperature to be considerably higher than that usual for purifying the NOx by reduction. When the operation continues for long periods of time in a low-speed and low-load region where the exhaust gas temperature of the engine is low, therefore, the temperature of the exhaust gas must be raised to a considerable degree to remove the SOx contamination. Thus, there arise such problems that the SOx contamination is not removed to a sufficient degree and the fuel is consumed in increased amounts for removing the SOx contamination.

In order to solve these problems, there has been devised a method of preventing the occurrence of SOx contamination by suppressing the occlusion of SOx in the exhaust gas by the NOx occluding and reducing catalyst.

For example, Japanese Patent No. 3154105 discloses a method of suppressing the occlusion by the NOx occluding and reducing catalyst by mixing an additive to the fuel thereby to convert gas components such as $SO_2$ and $SO_3$ in the exhaust gas into solid sulfates.

According to the method of '105 patent, an additive containing a metal compound such as barium is added to the fuel which is, then, supplied into the combustion chamber of an engine and is burned; i.e., the additive reacts with sulfur in the fuel and forms a sulfate (e.g., barium sulfate $BaSO_4$) in the form of solid particles.

Thus formed sulfate is in the form of solid particles and is not occluded by the NOx occluding and reducing catalyst unlike the gaseous sulfur oxide. In the method of '105 patent, therefore, the amount of SOx occluded by the NOx occluding and reducing catalyst does not increase, and the NOx purifying capability of the NOx occluding and reducing catalyst does not decrease (sulfur contamination does not occur) even after the $NO_x$ occluding and reducing catalyst is used for extended periods of time.

However, a method such as that disclosed in the '105 patent which decreases SOx in the exhaust gas by adding, to the fuel, an additive that forms a solid sulfate upon reacting with sulfur during the combustion, sometimes causes problems.

According to the method of '105 patent, for example, an additive is added to the fuel. That is, the additive must be mixed into the fuel beforehand, or the additive must be supplied separately from the fuel and be added into the fuel before it is supplied to the engine. Apart from the case where fuel premixed with the additive is supplied, it is desired that the interval for supplying the additive is lengthened as much as possible by minimizing the consumption of the additive, if the additive is supplied separately from the fuel. According to the method of '105 patent, however, no consideration has been given to suppressing the consumption of the additive.

Besides, the solid sulfate formed by the additive is in the form of fine particles, and is not trapped by the NOx occluding and reducing catalyst but is released into the atmosphere passing through the catalyst. Therefore, there arises a problem of an increase in the total amount of the particulate matter emitted from the engine if the additive is used even when it is not truly needed.

This problem occurs either when there is used the fuel into which the additive has been mixed already or when the fuel and the additive are separately supplied.

It has further been known that when an additive such as a metal compound is mixed into the fuel, there takes place knocking due to a decrease in the octane value of the fuel, as will be described later, or an increased deposit forms on the combustion chambers and on the exhaust valves of the engine.

Therefore, the above-mentioned problems must be solved when an additive such as a metal compound that forms a solid sulfate in the exhaust gas upon the reaction with sulfur is added to the fuel as in '105 patent. However, '105 patent does not give consideration to these problems.

SUMMARY OF THE INVENTION

In view of the problems inherent in the above-mentioned prior art, it is an object of the present invention to provide a method of purifying exhaust gas of internal combustion engines, capable of decreasing the consumption of a sulfur-solidifying agent, suppressing an increase in the amount of particulate matter, suppressing the occurrence of knocking and suppressing the formation of deposit when an agent that forms a solid sulfate in the exhaust gas upon reaction with sulfur (hereinafter called "sulfur-solidifying agent"), such as a metal compound, is supplied to the engine in order to suppress the sulfur contamination on the NOx occluding and reducing catalyst.

One or more of the objects as set forth above are achieved by the method of purifying exhaust gas of an internal combustion engine, according to the present invention, comprising steps of, disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio, and causing the catalyst to occlude the NOx in the exhaust gas from the engine when the engine is operated at a lean air-fuel ratio, and purifying the NOx occluded by the catalyst by reduction with reducing components in the exhaust gas from the engine when the engine is operated at the stoichiometric air-fuel ratio or at the rich air-fuel ratio, wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the condition of the atmosphere of said catalyst.

Namely, in the present invention, when the sulfur-solidifying agent is supplied to the engine, its amount of supply is controlled depending upon the condition of the atmosphere of the NOx occluding and reducing catalyst. As the sulfur-solidifying agent may be supplied to the engine in a decreased amount or may not be supplied if the condition of the atmosphere of the catalyst is not suitable for forming the sulfur contamination, therefore, it possible to decrease the consumption of the sulfur-solidifying agent and suppressing the particulate matter from increasing.

According to another aspect of the present invention, there is provided a method of purifying exhaust gas of an internal combustion engine comprising steps of disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio, and causing the catalyst to occlude the NOx in the exhaust gas from the engine when the engine is operated at a lean air-fuel ratio, and purifying the NOx occluded by the catalyst by reduction with reducing components in the exhaust gas from the engine when the engine is operated at the stoichiometric air-fuel ratio or at the rich air-fuel ratio, wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying the sulfur-solidifying agent to the engine is controlled depending upon the operating condition of the engine.

According to this aspect of the invention, when the sulfur-solidifying agent is to be supplied to the engine, the amount supplied is controlled depending upon the operating condition of the engine. Therefore, the sulfur-solidifying agent is supplied to the engine in a decreased amount or is not supplied when the SOx will not be occluded by the NOx occluding and reducing catalyst such as when engine is operated at a rich air-fuel ratio or when the temperature of the exhaust gas is high. This makes it possible to decrease the consumption of the sulfur-solidifying agent and to suppress the problem such as formation of particulate matter in an increased amount. It is further possible to suppress the formation of deposit and occurrence of knocking by decreasing the supply of the sulfur-solidifying agent when the engine is operated under the conditions where the deposit may increase or the knocking may occur.

According to another aspect of the invention, there is provided a method of purifying exhaust gas of an internal combustion engine comprising steps of disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio, and causing the catalyst to occlude the NOx in the exhaust gas from the engine when the engine is operated at a lean air-fuel ratio, and purifying the NOx occluded by the catalyst by reduction with reducing components in the exhaust gas from the engine when the engine is operated at the stoichiometric air-fuel ratio or at the rich air-fuel ratio, wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying the sulfur-solidifying agent to the engine is controlled depending upon the NOx occluding capability of the NOx occluding and reducing catalyst.

According to this aspect of the invention, when the sulfur-solidifying agent is to be supplied to the engine, its amount of supply is controlled depending upon the NOx occluding capability (purifying capability) of the NOx occluding and reducing catalyst. When, for example, the NOx occluding and reducing catalyst has a large NOx occluding capability, the NO occluding capability does not greatly decrease even though the SOx is occluded to some extent. However when the NOx occluding capability of the NOx occluding and reducing catalyst is decreased due to sulfur contamination or any other cause of deterioration, the NOx occluding capability may decrease greatly even when it occludes a small amount of the SOx in the exhaust gas. Therefore, the supplied amount of the sulfur-solidifying agent to the engine is controlled depending upon the NOx occluding capability of the NOx occluding and reducing catalyst in this aspect of the invention, in order to suppress the wasteful consumption of the sulfur-solidifying agent while maintaining a high NOx purification efficiency.

BRIEF DESCRIPTION OF THE DRAWINGS

The present invention will be better understood from the description, as set forth hereinafter, with reference to the accompanying drawings in which.

DESCRIPTION OF THE PREFERRED EMBODIMENT

Embodiments of the invention will now be described by using the accompanying drawings.

Figure 1:
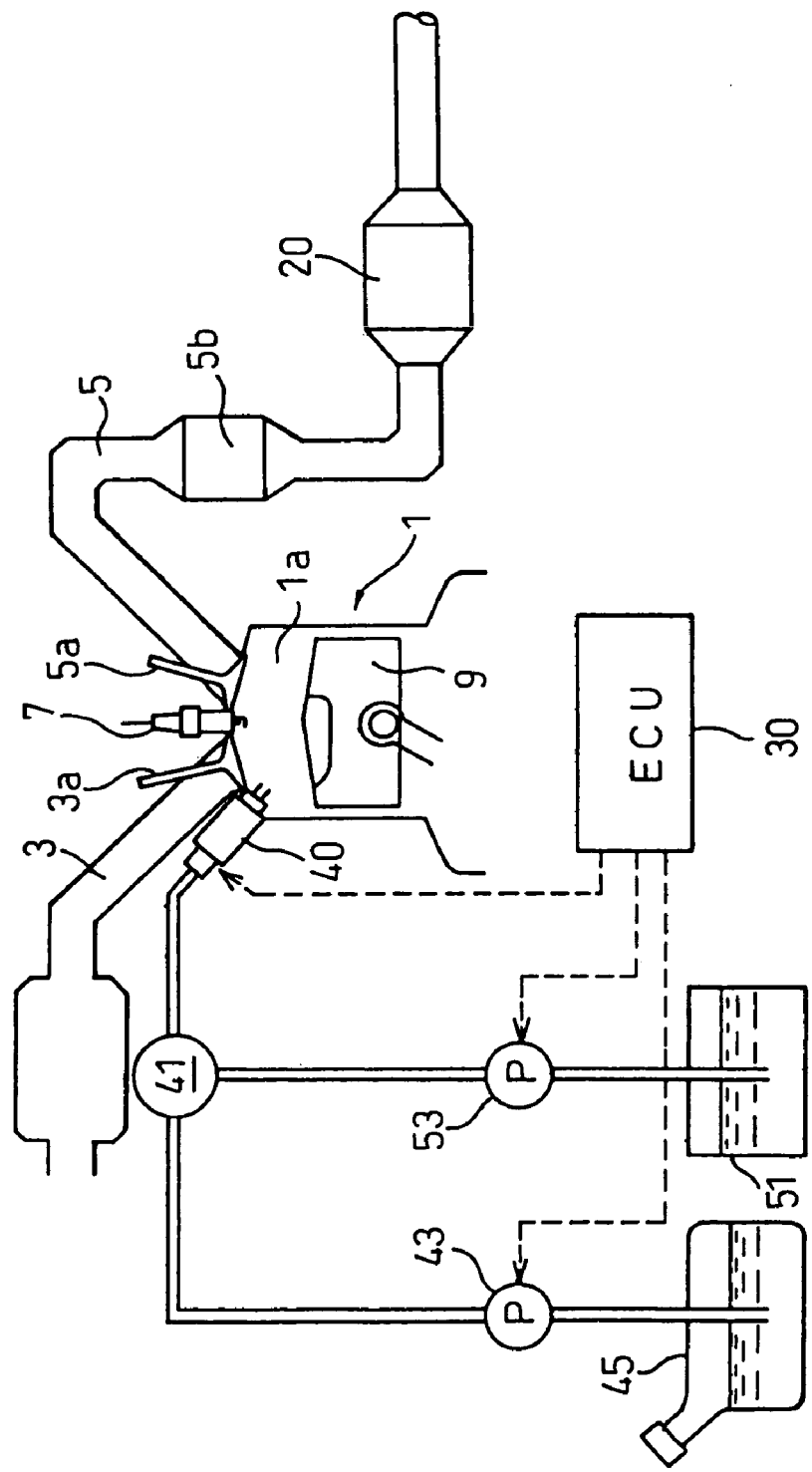
FIG. 1 is a diagram schematically illustrating the constitution of an apparatus for applying the method of purifying exhaust gas of the invention to an automotive engine.

FIG. 1 is a diagram schematically illustrating the basic constitution of the whole apparatus of when the method of purifying exhaust gas of the present invention is applied to an automotive gasoline engine.

In the drawing, reference numeral 1 denotes an internal combustion engine (the drawing illustrates one cylinder only), 1a denotes a cylinder combustion chamber, 3a denotes an intake valve, 5 denotes an exhaust gas passage, 5a denotes an exhaust valve, 7 denotes a spark plug, and 9 denotes a piston. Further, reference numeral 40 denotes a fuel injector for directly injecting the fuel into the engine combustion chamber 1a.

In this embodiment, the engine 1 is a so-called lean burn engine of which the operating air-fuel ratio is varied depending upon the load conditions and is operated at an air-fuel ratio leaner than the stoichiometric air-fuel ratio in most of the operation regions.

In the embodiment, a start catalyst 5b which is a known three-way catalyst is disposed in the exhaust gas passage 5 at a position close to the engine 1, and a NOx occluding and reducing catalyst 20 is disposed on the downstream thereof.

When the air-fuel ratio of the exhaust gas of the engine 1 is lean, the NOx occluding and reducing catalyst removes the NOx from the exhaust gas by selectively absorbing or adsorbing the NOx in the exhaust gas to hold (occlude) it. When the air-fuel ratio of the exhaust gas of the engine 1 becomes the stoichiometric air-fuel ratio or a rich air-fuel ratio, the NOx occluding and reducing catalyst releases the occluded NOx while reducing and purifying it into $N_2$ by using hydrocarbons and CO and other reducing components contained in the exhaust gas.

As the amount of NOx occluded by the NOx occluding and reducing catalyst 20 increases during the operation at a lean air-fuel ratio, the NOx occluding capability of the NOx occluding and reducing catalyst 20 decreases depending upon the amount of NOx that is occluded. As the removing efficiency (the purifying ratio) of NOx in the exhaust gas of the NOx occluding and reducing catalyst 20 decreases as the occluding capability of the NOx occluding and reducing catalyst decreases, the exhaust gas purification ratio of the NOx occluding and reducing catalyst 20 decreases with an increase in the amount of NOx occluded by the catalyst 20. In a state where the NOx occluding and reducing catalyst has occluded the NOx to the maximum amount that can be occluded (i.e., the saturated state), the NOx occluding and reducing catalyst 20 is not capable of occluding the NOx in the exhaust gas any more, and the NOx occluding and reducing catalyst 20 exhibits a zero NOx purification ratio.

According to this embodiment, a rich spike operation in which the engine 1 is operated at a rich air-fuel ratio for a short period is conducted in order to prevent a drop in the NOx removing efficiency when the amount of NOx occluded by the NOx occluding and reducing catalyst 20 has increased to some extent (or when the NOx purification ratio has dropped to some extent).

Upon conducting the rich spike operation, the air-fuel ratio of the exhaust gas of the engine 1 temporarily becomes a rich air-fuel ratio; i.e., the oxygen concentration thereof decreases and the amounts of unburned hydrocarbons, $CO_2$ and CO, which are reducing components in the exhaust gas, increase. These components react with the NOx occluded by the NOx occluding and reducing catalyst 20, whereby the NOx occluded by the NOx occluding and reducing catalyst is reduced and purified into $N_2$ and is released from the NOx occluding and reducing catalyst 20.

Owing to the rich spike operation, the amount of NOx occluded by the NOx occluding and reducing catalyst 20 decreases, and the NOx occluding and reducing catalyst recovers its NOx occluding capability.

However, the gasoline contains trace amounts of sulfur components and, hence, the exhaust gas of the engine 1 contains SOx (sulfur oxides such as $SO_2$, $SO_3$, etc) formed by the combustion of sulfur.

Like NOx, the SOx is occluded by the NOx occluding and reducing catalyst by adsorption or by absorption. Besides, the SOx that is once occluded is not released from the NOx occluding and reducing catalyst despite of conducting the rich spike operation for reducing and purifying the NOx.

Therefore, even if the rich spike operation is conducted at a suitable interval during the operation at a lean air-fuel ratio, the amount of SOx occluded by the NOx occluding and reducing catalyst continues to increase. When the SOx is occluded in an increased amount, too, the NOx occluding and reducing catalyst exhibits a decreased NOx occluding capability like when the NOx is occluded in an increased amount, and the NOx purifying capability decreases correspondingly. A drop in the NOx purification ratio of the NOx occluding and reducing catalyst due to an increase in the occluded amount of SOx is referred to as "sulfur contamination" in this specification.

The SOx occluded by the NOx occluding and reducing catalyst can be released therefrom by supplying the rich exhaust gas of a high temperature into the NOx occluding and reducing catalyst. In order to remove the sulfur contamination, however, the operation must be conducted for a certain period of time at a rich air-fuel ratio while elevating the temperature of the exhaust gas to be considerably higher than that of during the normal operation. This causes problems such as a change in the torque produced by the engine, an increase in the fuel consumption and an insufficient removal of the sulfur contamination during the operation.

In practice, therefore, it is better to suppress the sulfur contamination of the NOx occluding and reducing catalyst by decreasing the SOx in the exhaust gas than to remove the sulfur contamination that has once occurred.

In this embodiment, therefore, the sulfur-solidifying agent is supplied to the engine to burn it together with the fuel in order to decrease the amount of SOx in the exhaust gas.

The sulfur-solidifying agent used in the embodiment is a compound containing a metal such as potassium (K), barium (Ba), calcium (Ca), iron (Fe) or cesium (Ce), and is supplied to the engine combustion chamber in the form of a liquid solution dissolved in a solvent or in the liquid fuel. During the combustion, the sulfur-solidifying agent selectively reacts with the sulfur component in the fuel to form a solid metal sulfate in the exhaust gas. The sulfate of the metal is in the form of solid particles at normal exhaust gas temperatures, and is not occluded by the catalyst even when it flows into the NOx occluding and reducing catalyst but passes through the catalyst. On the other hand, the amount of gaseous SOx ($SO_2$, $SO_3$, etc.) in the exhaust gas decreases by an amount by which the sulfate is formed. By supplying the sulfur-solidifying agent to the engine, therefore, it becomes possible to prevent the sulfur contamination of the NOx occluding and reducing catalyst.

To supply the sulfur-solidifying agent to the engine, however, the fuel to which the sulfur-solidifying agent is added must be supplied to the fuel tank of the engine, or a device must be provided for supplying the sulfur-solidifying agent to the engine separately from the fuel. In either case, it is desired to decrease the consumption of the sulfur-solidifying agent as much as possible to lower the operation cost of the engine.

The sulfur-solidifying agent forms solid particles (sulfate) which are not trapped by the catalyst but are exhausted downstream of the catalyst. When the sulfur-solidifying agent is used, therefore, the amount of particulate matter released from the engine slightly increases. This is not desirable and, from the standpoint of preventing an increase in the amount of particulate matter, therefore, it is desired to decrease the use of the sulfur-solidifying agent as much as possible.

When the sulfur-solidifying agent is burned in the combustion chamber together with the fuel, the amount of deposit on the exhaust valves increases and the knocking often occurs as will be described later.

In using the sulfur-solidifying agent, therefore, it is desired to determine whether it should be used or to determine the amount of its addition by taking the above problems into consideration. In order to determine whether the sulfur-solidifying agent should be used depending upon various conditions or to change the amount of use depending upon the conditions, it becomes necessary to supply the sulfur-solidifying agent by using a device separate from the device for supplying the fuel to adjust the supplied amount instead of using the fuel to which the sulfur-solidifying agent has been mixed in advance.

In this embodiment, by taking the above into consideration, the sulfur-solidifying agent is stored separately from the fuel of the engine 1, and is added to the fuel immediately before it is injected from the fuel injector 40 into the engine 1.

In FIG. 1, reference numeral 45 denotes a fuel tank of the engine 1, and 43 denotes a high-pressure fuel pump. Reference numeral 41 denotes a common rail connected to the fuel injectors 40 in the cylinders. The common rail 41 is supplied with the fuel in the fuel tank 45 being pressurized by the high-pressure fuel pump 43, and the fuel is distributed to the fuel injectors 40 of the cylinders from the common rail 41.

In this embodiment, provision is made of a system for supplying the sulfur-solidifying agent separately from the fuel system such as the fuel tank 45 and the fuel pump 43. In FIG. 1, reference numeral 51 denotes an additive tank for storing an additive comprising the fuel or a combustible solvent in which the sulfur-solidifying agent is dissolved at a suitable concentration, and 53 denotes an additive pump for adding, into the common rail 41, the additive in the tank while highly pressurizing it. The additive added to the common rail 41 is mixed in the common rail 41 with the fuel supplied from the fuel tank 45, and is injected into the combustion chamber through the fuel injector 40.

The additive pump 53 is provided with a discharge amount control mechanism, and supplies, to the common rail 41, the additive at a flow rate that varies depending upon an amount-adjusting signal from the ECU 30 that will be described later. According to this embodiment, as will be described later, the discharge amount of the additive pump 53 is adjusted depending the condition of the atmosphere at the NOx occluding and reducing catalyst 20 and the operating condition of the engine, to control the amount of the additive supplied to the engine 1.

In FIG. 1, reference numeral 30 denotes an electronic control unit (ECU) of the engine 1. In this embodiment, the ECU 30 is constituted as a known microcomputer in which a ROM, a RAM, a CPU and input/output ports are connected together through a bi-directional bus. The ECU 30 performs fundamental controls, such as controlling the injection pressure by varying the fuel pressure in the common rail 41 by controlling the discharge amount of the fuel pump 43 depending upon the operating condition, controlling the fuel injection amount by controlling the timing and period for activating the fuel injector 40, and controlling the fuel injection by controlling the timing for activating the fuel injector 40. In this embodiment, the ECU 30 further controls the supply of the additive by controlling the discharge amount of the additive pump 53 depending upon the conditions.

In this embodiment, as described above, the sulfur-solidifying agent is stored in the tank 51 separately from the fuel and is supplied to the engine. Therefore, the sulfur-solidifying agent must be supplied to the tank 51 separately from the fuel, and the consumption of the sulfur-solidifying agent must be decreased as much as possible from the standpoint of reducing the frequency of supply. It is therefore desired to decrease the consumption of the sulfur-solidifying agent by supplying the sulfur-solidifying agent only when it is needed, instead of supplying the sulfur-solidifying agent to the engine at all times while the engine is in operation.

As described above, further, use of the sulfur-solidifying agent involves such problems as the emission of the particulate matter in an increased amount, formation of deposit on the engine and occurrence of knocking. Therefore, the sulfur-solidifying agent must be supplied to the engine by taking these problems into consideration.

Described below are the embodiments of the method of controlling the supply of the additive by taking the above problems into consideration.

(1) First Embodiment.

In this embodiment, the sulfur-solidifying agent is supplied to the engine under a condition where the SOx can be easily occluded by the NOx occluding and reducing catalyst 20. Namely, the object of supplying the sulfur-solidifying agent to the engine is to prevent the occlusion of SOx by the NOx occluding and reducing catalyst 20. Under a condition where the SOx can hardly be occluded by the NOx occluding and reducing catalyst 20, there occurs no problem even if the sulfur-solidifying agent is supplied in a decreased amount or is not supplied.

In this embodiment, therefore, the sulfur-solidifying agent is not supplied or is supplied in a decreased amount under a condition where the occlusion of SOx by the NOx occluding and reducing catalyst 20 is suppressed to thereby decrease the consumption of the sulfur-solidifying agent and to suppress the formation of the particulate matter, formation of deposit and occurrence of knocking.

One of the conditions dominating the occlusion of SOx by the NOx occluding and reducing catalyst is the catalyst atmosphere (air-fuel ratio of the exhaust gas).

That is, when the air-fuel ratio of the exhaust gas is lean, the SOx is easily occluded by the NOx occluding and reducing catalyst. As the air-fuel ratio of the exhaust gas becomes rich, however, the SOx is hardly occluded by the NOx occluding and reducing catalyst.

In this embodiment, therefore, the condition for suppressing the occlusion of SOx by the NOx occluding and reducing catalyst 20 is that the catalyst atmosphere is at the stoichiometric air-fuel ratio or a lean air-fuel ratio, or the engine is operated under such a condition that the catalyst atmosphere becomes the stoichiometric air-fuel ratio or a lean air-fuel ratio (combustion air-fuel ratio becomes the stoichiometric air-fuel ratio or a lean air-fuel ratio). When one or more of these conditions are satisfied, the sulfur-solidifying agent is not supplied to the engine 1 or is supplied thereto in a decreased amount.

In detail, the sulfur-solidifying agent is not supplied or is supplied in a decreased amount in the following cases in this embodiment.

1) When the engine is operating at the stoichiometric air-fuel ratio or at a rich air-fuel ratio due to a change in the traveling condition of the vehicle and operating condition of the engine.

Figure 2:
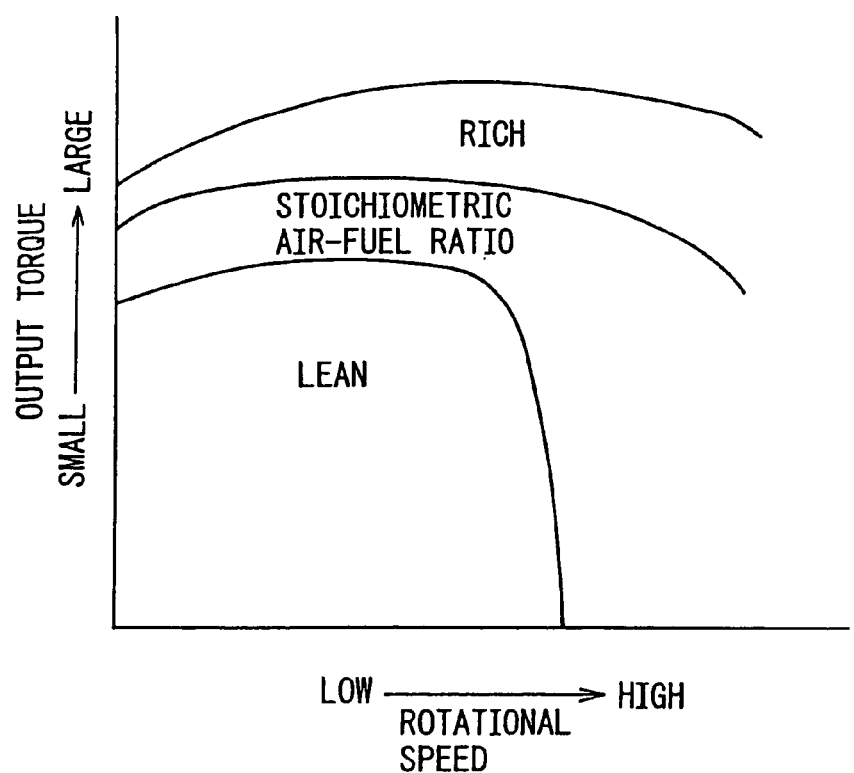
FIG. 2 is a diagram illustrating a relationship between the load conditions of the engine of FIG. 1 and the operating air-fuel ratio.

FIG. 2 is a diagram illustrating a relationship between the load condition and the operating air-fuel ratio of the engine 1 according to the embodiment. In this embodiment as shown in FIG. 2, the operating air-fuel ratio of the engine 1 is varied depending upon the load condition. Namely, in the region where the engine rotational speed is in a low to intermediate range and the engine output torque (accelerator opening degree) is in a small to intermediate range, the engine is operated at a lean air-fuel ratio. In a region where the rotational speed and the output torque are in an intermediate to high range, the engine is operated at the stoichiometric air-fuel ratio. In a region where the rotational speed and the output torque are in a high range, further, the engine is operated at a rich air-fuel ratio.

In this embodiment, therefore, when the engine load condition is such that the engine is operated at the stoichiometric air-fuel ratio or at a rich air-fuel ratio, the sulfur-solidifying agent is not supplied or is supplied in a decreased amount.

2) When the rich spike operation is executed.

In this embodiment, the rich spike operation is carried out to operate, at regular intervals and at a rich air-fuel ratio and for a short period of time, the engine 1, that is in operation, at a lean air-fuel ratio in order to reduce and purify the NOx occluded by the NOx occluding and reducing catalyst 20.

Through the normal rich spike operation as described above, the SOx occluded by the NOx occluding and reducing catalyst cannot be released. When the rich spike operation is being executed, however, the exhaust gas becomes a rich air-fuel ratio and, hence, the SOx in the exhaust gas is not occluded by the NOx occluding and reducing catalyst.

In this embodiment, therefore, the sulfur-solidifying agent is not supplied or is supplied in a decreased amount while the rich spike operation is being executed.

3) When the sulfur contamination-removing operation is executed.

The SOx once occluded by the NOx occluding and reducing catalyst can be released from the NOx occluding and reducing catalyst by executing the sulfur contamination-removing operation by holding the time in which the exhaust gas temperature is maintained to be higher than the normal temperature under the rich air-fuel ratio condition. When the sulfur contamination-removing operation is executed, the SOx is not occluded by the NOx occluding and reducing catalyst as a matter of course.

According to this embodiment, therefore, the sulfur-solidifying agent is not supplied or is supplied in a decreased amount when the sulfur contamination-removing operation is being executed.

4) When the bank control is executed.

During the rich spike operation and the sulfur contamination-removing operation, the exhaust gas flowing into the NOx occluding and reducing catalyst must have a rich air-fuel ratio. In this case, in general, the whole cylinders of the engine are operated at a rich air-fuel ratio, so that the exhaust gas flowing into the catalyst acquires a rich air-fuel ratio. It is, however, also possible to carry out the rich spike operation and the sulfur contamination-removing operation by conducting a so-called bank control according to which, for example, some cylinders are operated at a rich air-fuel ratio and other cylinders are operated at a lean air-fuel ratio, such that the exhaust gas from the cylinders after having mixed together acquires a rich air-fuel ratio.

Upon conducting bank control, the exhaust gas containing unburned HC in large amounts is exhausted from the cylinders that are operated at a rich air-fuel ratio, and the exhaust gas containing oxygen in large amounts is exhausted from the cylinders operated at a lean air-fuel ratio. Accordingly, the exhaust gas after having mixed together and flowing into the catalyst as a whole has a rich air-fuel ratio and contains unburned HC and oxygen in large amounts. On the NOx occluding and reducing catalyst, therefore, the unburned HC reacts with oxygen, whereby heat is generated by the oxidation reaction and the temperature of the catalyst rises. Bank control is conducted when the catalyst temperature is low or when the catalyst temperature must be elevated as when the sulfur contamination-removing operation is to be conducted, to elevate the temperature of the NOx occluding and reducing catalyst.

When the bank control is being executed, at least some of the cylinders are operated at a rich air-fuel ratio. In the combustion in these cylinders, therefore, the sulfur oxide such as SOx is hardly formed. Therefore, the sulfur-solidifying agent need not, at least, be supplied to the cylinders operating at a rich air-fuel ratio. When the bank control is conducted to execute the rich spike and the sulfur contamination-removing operation, further, the exhaust gas flowing into the catalyst as a whole has a rich air-fuel ratio to suppress the absorption of SOx by the NOx occluding and reducing catalyst. In this case, therefore, the sulfur-solidifying agent is supplied to none of the cylinders.

Figure 3:
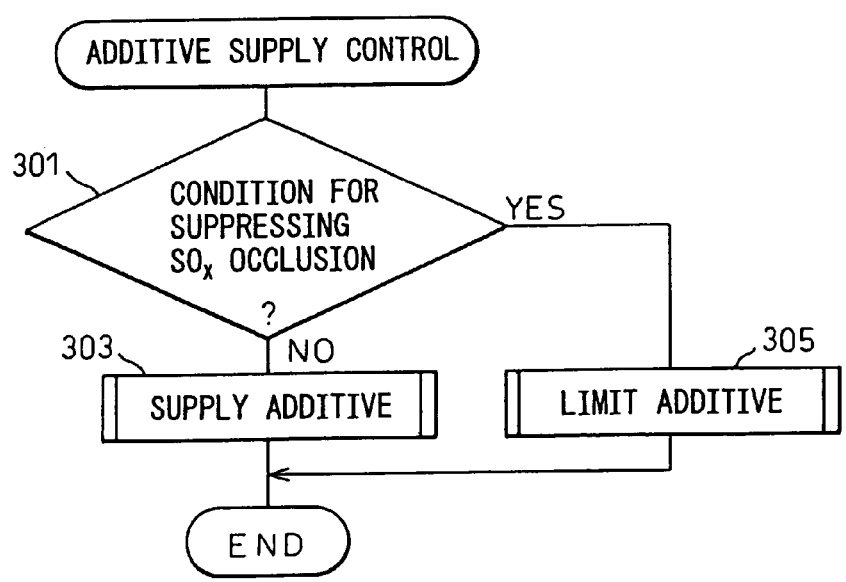
FIG. 3 is a flowchart illustrating a first embodiment of the additive supply control operation in the method of purifying exhaust gas according to the present invention.

FIG. 3 is a flowchart illustrating the additive supply control operation. This operation is executed by the ECU 30 at regular intervals.

In the operation of FIG. 3, it is determined at step 301, first, whether the condition for suppressing the occlusion of SOx by the NOx occluding and reducing catalyst is satisfied. The condition for suppressing the SOx occlusion determined at step 301 is, as described above, 1) the engine is now being operated in a region of the stoichiometric air-fuel ratio or a rich air-fuel ratio, 2) the rich spike operation is being executed, 3) the sulfur contamination-removing operation is being executed, or 4) the bank control is being executed. When any one or more of 1) to 4) are satisfied, it is determined that the SOx occlusion suppressing condition is satisfied.

When the condition of step 301 is not satisfied, the routine proceeds to step 303 where the discharge amount of the additive pump 53 is set to a predetermined value, and the additive is injected at a predetermined flow rate into the common rail 41. Then, the sulfur-solidifying agent mixed into the fuel in the common rail 41 is injected into the combustion chambers in the cylinders from the fuel injectors 40. The supplied amount of the additive is so set that the concentration of the sulfur-solidifying agent in the fuel injected into the combustion chamber is not large enough to form the particulate matter in large amounts but does ensure that the gaseous SOx decreases in the exhaust gas. The amount of supplying the additive, however, varies depending upon the kind of the fuel, type of the engine, etc. It is, therefore, desired to determine an optimum concentration in advance by experiment.

When the SOx occlusion suppressing condition is held at step 301, on the other hand, the routine proceeds to step 305 where the additive supply limiting operation is carried out. In the additive supply limiting operation, the ECU 30 decreases the discharge amount of the additive pump 53 to be smaller than the discharge amount at step 303 or stops the discharge of the pump 53. This decreases the consumption of the sulfur-solidifying agent, and suppresses the formation of particulate matter, deposit and the occurrence of knocking.

Figure 4:
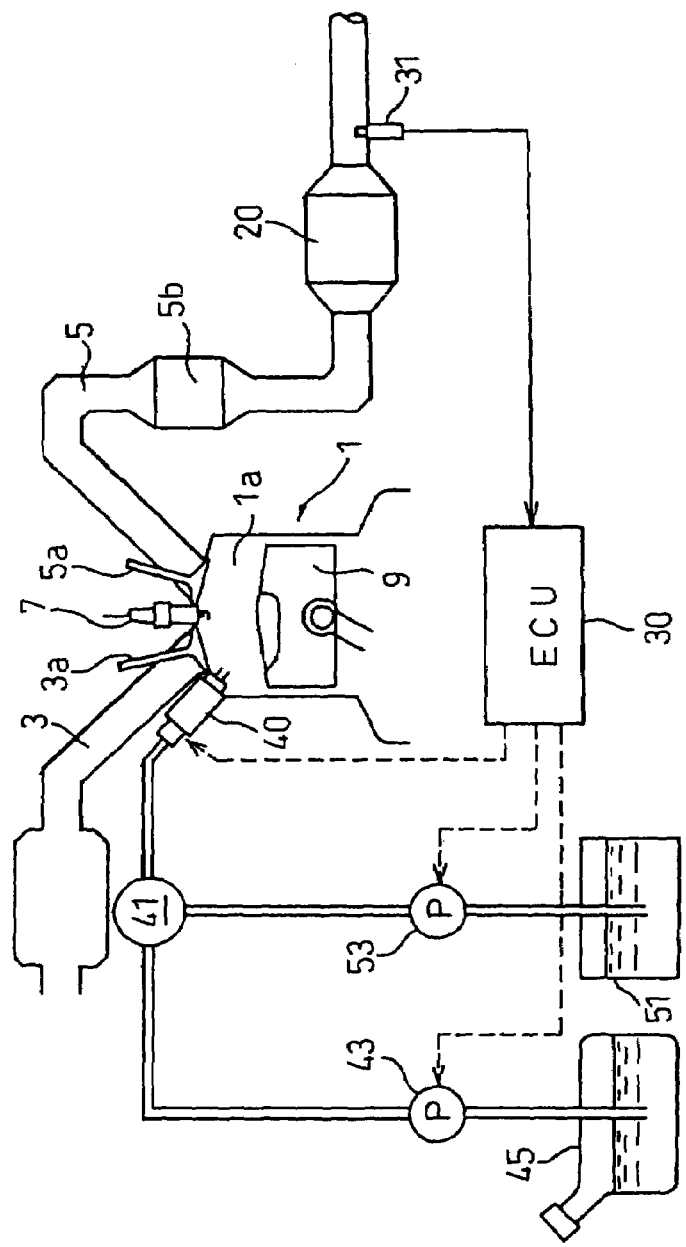
FIG. 4 is a diagram schematically illustrating the constitution of the apparatus according to a modified example of the first embodiment.

FIG. 4 is a diagram similar to FIG. 1 and illustrates the constitution of an apparatus for putting a modified example of the embodiment into practice. In FIG. 4, the same reference numerals as those of FIG. 1 denote the same elements as those of FIG. 1.

The constitution of FIG. 4 is different from the constitution of FIG. 1 only in that the air-fuel ratio sensor 31 is disposed in the exhaust gas passage downstream of the NOx occluding and reducing catalyst 20.

The air-fuel ratio sensor 31 is the one for detecting the air-fuel ratio of the exhaust gas based on the oxygen concentration in the exhaust gas.

In the above-mentioned embodiment, the operating condition of the engine in which the atmosphere of the NOx occluding and reducing catalyst becomes a rich air-fuel ratio is regarded as the SOx occlusion suppressing condition (step 301 in FIG. 3). In practice, however, even when the exhaust gas of the engine acquires a rich air-fuel ratio, the atmosphere of the catalyst does not immediately become rich due to the emission of oxygen from the catalyst surfaces, and a slight time deviation occurs.

In this embodiment, therefore, the supply of additive is controlled more precisely by detecting the air-fuel ratio of the exhaust gas that has really passed through the NOx occluding and reducing catalyst 20 by using the air-fuel ratio sensor 31 disposed on the downstream of the NOx occluding and reducing catalyst 20 and by directly judging the condition of atmosphere of the NOx occluding and reducing catalyst 20.

Namely, in this operation, the air-fuel ratio of the exhaust gas on the downstream of the NOx occluding and reducing catalyst 20 is detected by using the air-fuel ratio sensor 31. When the detected air-fuel ratio is lean, the additive is supplied at step 303 in FIG. 3. When the air-fuel ratio that is detected is stoichiometric or rich, the supply of additive is limited at step 305. When the supply of the additive is not stopped but is continued in a decreased amount, the amount of supplying the additive may be decreased with, for example, a decrease in the air-fuel ratio (as the air-fuel ratio becomes rich).

(2) Second Embodiment.

Next, a second embodiment of the invention will be described.

In the above-mentioned embodiment, the supply of the sulfur-solidifying agent to the engine was controlled depending upon the condition of atmosphere of the NOx occluding and reducing catalyst. In this embodiment, however, the sulfur-solidifying agent is not supplied to the engine or is supplied in a decreased amount under the condition where the SOx is released from the NOx occluding and reducing catalyst.

In a state where the occluded SOx is released from the NOx occluding and reducing catalyst as described above, the SOx in the exhaust gas is not occluded by the NOx occluding and reducing catalyst even when the gaseous SOx is contained in the exhaust gas.

In this embodiment, therefore, the sulfur-solidifying agent is not supplied or is supplied in a decreased amount under the condition where the SOx is released from the NOx occluding and reducing catalyst 20 thereby to decrease the consumption of the sulfur-solidifying agent and to suppress the formation of particulate matter, deposit and the occurrence of knocking.

As described earlier, the NOx occluding and reducing catalyst releases the SOx which it has occluded when the temperature of the catalyst is high.

In this embodiment, therefore, the following engine operating condition where the temperature of the catalyst rises is regarded to be the SOx releasing condition.

1) When the engine continues to operate at a high speed carrying a large load (or the vehicle travels at a high speed).

As described with reference to FIG. 2, the engine 1 according to the embodiment is operated at the stoichiometric air-fuel ratio or at a rich air-fuel ratio when it runs at a high speed carrying a large load. During the operation at a high speed carrying a large load, therefore, the exhaust gas temperature of the engine rises. When the engine continues to run at a high speed carrying a large load (when the vehicle is operated at a high speed) to some extent, therefore, the temperature of the catalyst has been raised, and the SOx is not occluded by the NOx occluding and reducing catalyst.

In this embodiment, therefore, the sulfur-solidifying agent is not supplied or is supplied in a decreased amount when the engine continues to operate at a high speed carrying a large load (or when the vehicle is operated at a high speed) for longer than a predetermined period of time.

2) When the sulfur contamination-removing operation is executed.

When the sulfur contamination-removing operation is executed, the catalyst is acquiring a rich air-fuel ratio and a high temperature, and the occluded SOx is released from the NOx occluding and reducing catalyst. Therefore, the SOx is not occluded by the NOx occluding and reducing catalyst even when the SOx is contained in the exhaust gas.

In this embodiment, therefore, the sulfur-solidifying agent is not supplied or is supplied in a decreased amount when the sulfur contamination-removing operation is executed for the NOx occluding and reducing catalyst 20.

3) When the bank control is executed.

When the bank control is executed for the engine as described above, unburned hydrocarbons emitted from the cylinders of a rich air-fuel ratio burn on the NOx occluding and reducing catalyst, and the catalyst temperature rises. In this case, too, therefore, the temperature of the NOx occluding and reducing catalyst rises, the SOx occluded by the NOx occluding and reducing catalyst is easily released, and the SOx is hardly occluded.

In this embodiment, therefore, the sulfur-solidifying agent is not supplied or is supplied in a decreased amount when the bank control is executed for the engine.

Figure 5:
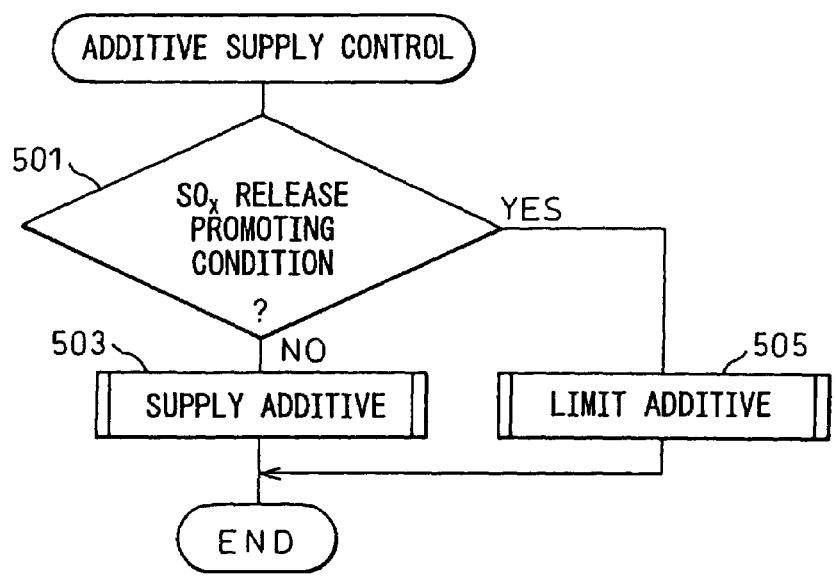
FIG. 5 is a flowchart illustrating a second embodiment of the additive supply control operation in the method of purifying exhaust gas according to the present invention.

FIG. 5 is a flowchart concretely illustrating the additive supply control operation mentioned above. This operation is executed by the ECU 30 at regular intervals.

In the operation of FIG. 5, it is determined at step 501, first, whether the condition of atmosphere of the NOx occluding and reducing catalyst is now the one for promoting the release of SOx. Here, the condition for promoting the release of SOx from the NOx occluding and reducing catalyst is, as described above, 1) the engine is continuously operating at a high speed carrying a high load (vehicle is traveling at a high speed) for more than a predetermined period of time, 2) the sulfur contamination-removing operation is being executed, or 3) the bank control is being executed for the engine. When any one or more of 1) to 3) are satisfied, it is determined that the SOx release promoting condition is satisfied.

When the SOx release promoting condition is satisfied at step 501, the routine proceeds to step 503 where the additive is supplied to the engine. When the SOx release promoting condition is not satisfied, the routine proceeds to step 505 to stop the supply of additive to the engine or to supply the additive in a decreased amount. Steps 503 and 505 are the same operations as those of steps 303 and 305 of FIG. 3.

Upon executing the operation of FIG. 5, it is possible to decrease the consumption of the sulfur-solidifying agent and to suppress the formation of particulate matter, deposit and the occurrence of knocking.

Next, a modified example of this embodiment will be described with reference to FIG. 6.

Figure 6:
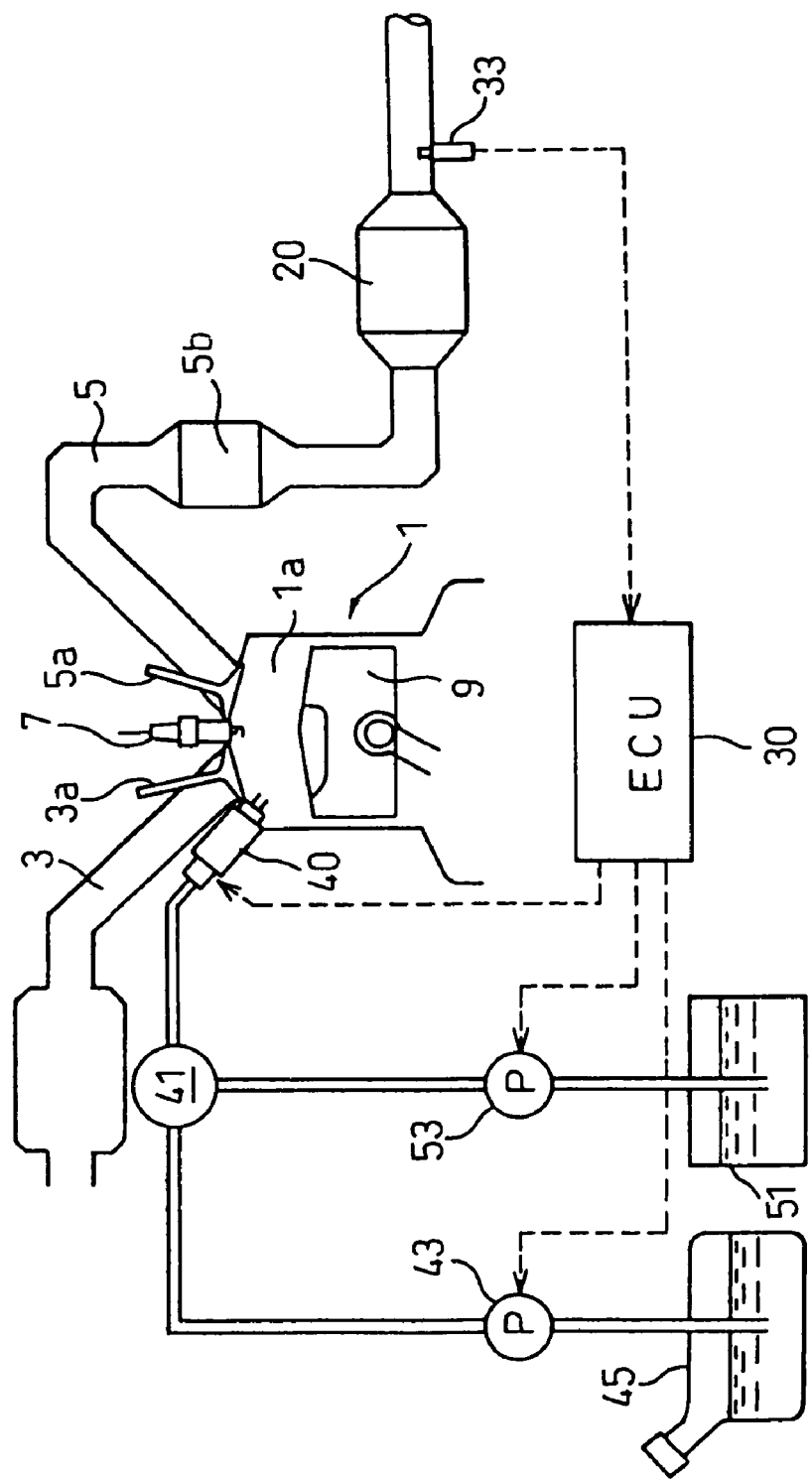
FIG. 6 is a diagram schematically illustrating the constitution of the apparatus according to a modified example of the second embodiment.

FIG. 6 is a diagram similar to FIG. 1 and illustrates the constitution of an apparatus for putting the modified example of the embodiment into practice. In the drawing, the same reference numerals as those of FIG. 1 denote the same elements as those of FIG. 1.

The constitution of FIG. 6 is diffrent from the constitution of FIG. 1 only with respect to the disposition of the exhaust gas temperature sensor 33 in the exhaust gas passage downstream of the NOx occluding and reducing catalyst 20.

In the embodiment of FIG. 6, it is directly determined whether the condition for promoting the release of SOx from the NOx occluding and reducing catalyst 20 is satisfied based on the temperature of the exhaust gas detected by the exhaust gas temperature sensor 33 instead of indirectly estimating it from the engine operating condition. That is, when the temperature of the exhaust gas after having passed through the NOx occluding and reducing catalyst 20 is higher than a predetermined value as detected by the exhaust gas temperature sensor 33, the ECU 30 so judges that a condition for promoting the release of SOx from the NOx occluding and reducing catalyst 20 is satisfied.

Upon directly judging the condition of atmosphere of the NOx occluding and reducing catalyst 20 based on the exhaust gas temperature detected by the exhaust gas temperature sensor 33 downstream of the catalyst 20, it is possible to control the supply of the additive more correctly.

(3) Third Embodiment.

Next, described below is a third embodiment of the present invention. In the above first and second embodiments, the consumption of the sulfur-solidifying agent was decreased and the formation of the particulate matter was suppressed by not supplying the sulfur-solidifying agent or by supplying the sulfur-solidifying agent in a decreased amount when the NOx occluding and reducing catalyst was under a condition where the SOx was hardly occluded.

In this embodiment, on the other hand, the occlusion of SOx by the NOx occluding and reducing catalyst is permitted to some extent within a range in which there is no drop in the NOx purification efficiency which is the principal function of the NOx occluding and reducing catalyst.

The NOx occluding ability of the NOx occluding and reducing catalyst varies depending upon various factors such as the catalyst temperature, amount of NOx occluded in the catalyst, deterioration of the catalyst (inclusive of sulfur contamination). When the NOx occluding and reducing catalyst has a sufficiently large NOx occluding ability, the NOx purification efficiency does not decrease too much owing to a margin in the NOx occluding capability even if the SOx is occluded to some extent.

However, when the SOx is occluded in a state where there is no margin in the decreased NOx occluding capability of the NOx occluding and reducing catalyst, a drop in the NOx purification efficiency becomes relatively great.

In this embodiment, therefore, when the NOx occluding and reducing catalyst has a sufficiently large NOx occluding capability, the sulfur-solidifying agent is not supplied to the engine or is supplied thereto in a decreased amount. When the NOx occluding capability has dropped to be smaller than a given value, the sulfur-solidifying agent is supplied in an increased amount to the engine or the supply thereof is resumed.

In this embodiment, therefore, it is possible to decrease the consumption of the sulfur-solidifying agent and to suppress the formation of particulate matter, etc.

Figure 7:
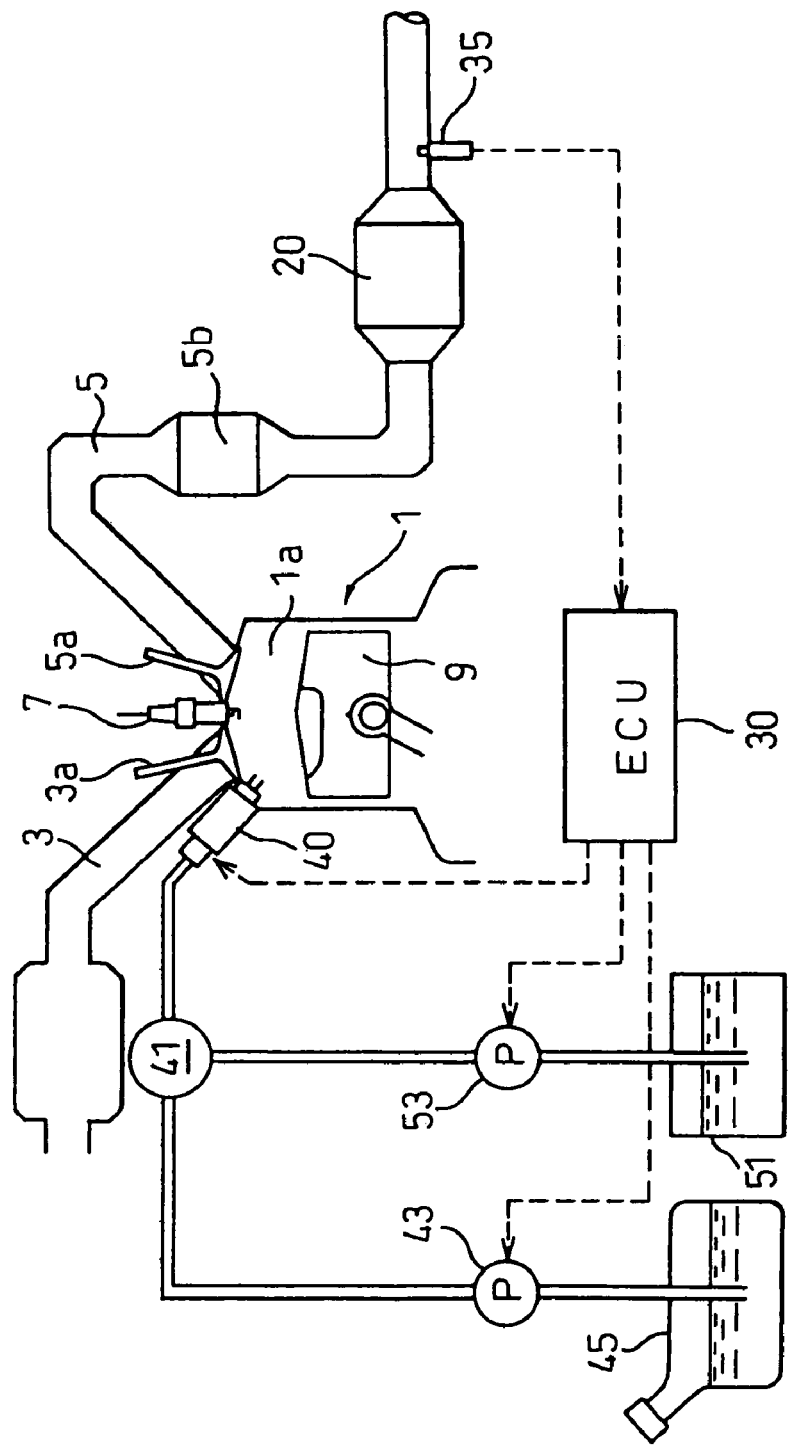
FIG. 7 is a diagram schematically illustrating the constitution of an apparatus for carrying out a third embodiment of the additive supply control operation in the method of purifying exhaust gas according to the present invention.

FIG. 7 is a diagram similar to FIG. 1 and illustrates the constitution of an apparatus for carrying out the method of purifying exhaust gas according to the embodiment. In FIG.

7, the same reference numerals as those of FIG. 1 denote the same elements as those of FIG. 1.

The embodiment of FIG. 7 is different from the constitution of FIG. 1 only with respect to the NOx concentration sensor 35 disposed in the exhaust gas passage downstream of the NOx occluding and reducing catalyst 20 to detect the NOx concentration in the exhaust gas.

During the operation at a lean air-fuel ratio, the NOx occluding and reducing catalyst 20 occludes the NOx in the exhaust gas. Therefore, the amount of NOx occluded by the NOx occluding and reducing catalyst 20 gradually increases, and the NOx occluding capability of the NOx occluding and reducing catalyst decreases correspondingly. As the NOx occluding capability decreases, the NOx purification efficiency of the catalyst also decreases. The portion of the NOx in the exhaust gas passing through the $NO_x$ occluding and reducing catalyst without being occluded by the catalyst increases. That is, the NOx concentration in the exhaust gas downstream of the catalyst increases with a decrease in the occluding capability of the NOx occluding and reducing catalyst.

In this embodiment, the NOx occluding capability of the NOx occluding and reducing catalyst 20 is judged to have decreased to smaller than a predetermined value when the NOx concentration detected by the NOx concentration sensor 35 has become greater than a predetermined value by using the NOx concentration in the exhaust gas detected by the NOx concentration sensor disposed on the downstream of the NOx occluding and reducing catalyst 20 as an index for representing the NOx occluding capability of the NOx occluding and reducing catalyst 20. Then, the sulfur-solidifying agent is supplied to the engine in an increased amount or the supply thereof is resumed to prevent a large drop in the NOx purification efficiency.

In this embodiment, therefore, it is possible to decrease the consumption of the sulfur-solidifying agent and to suppress the formation of particulate matter, etc.

Figure 8:
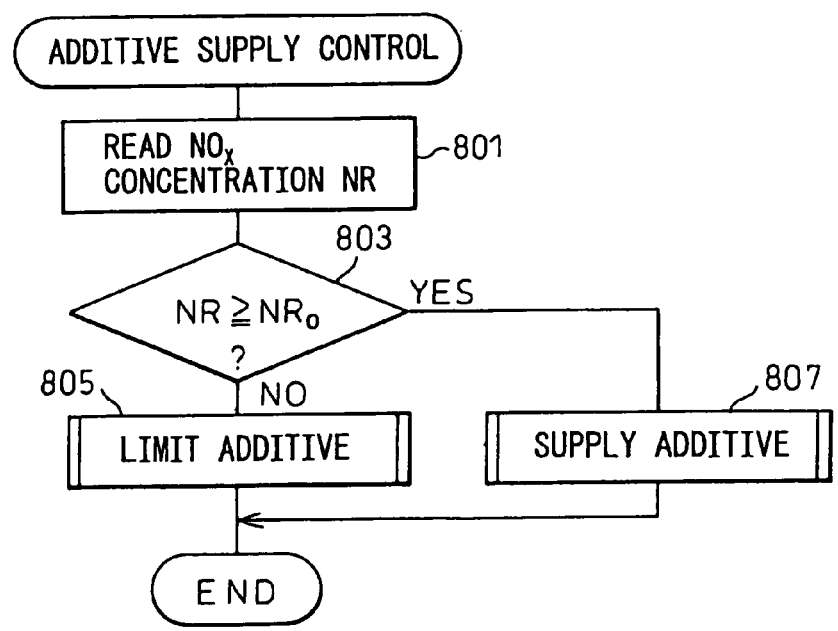
FIG. 8 is a flowchart illustrating the third embodiment of the additive supply control operation in the method of purifying exhaust gas according to the present invention.

FIG. 8 is a flowchart illustrating the additive supply control operation according to the embodiment. This operation is executed by the ECU 30 at regular intervals.

In the operation of FIG. 8, step 801 reads a NOx concentration NR in the exhaust gas downstream of the NOx occluding and reducing catalyst 20 detected by the NOx concentration sensor 35. At step 803, then, it is determined whether the NOx concentration NR that is read is greater than a predetermined reference value $NR_0$. In this embodiment, the reference value $NR_0$ has been set to be a suitable value smaller than an allowable NOx concentration downstream of the catalyst 20.

When NR<$NR_0$ at step 803, the NOx flows in decreased amounts to the downstream of the catalyst 20 and it is considered that there is still a margin in the NOx occluding capability of the NOx occluding and reducing catalyst 20. Accordingly, the routine proceeds to step 805 where the supply of the additive is discontinued or the additive is supplied in a decreased amount, to the engine 1.

When NR≧$NR_0$ at step 803, on the other hand, it can be determined that there is little margin in the NOx occluding capability that has decreased of the NOx occluding and reducing catalyst 20. In this case, therefore, the amount of the additive is increased at step 807 to an amount larger than the amount of supply at step 805. Or, when the supply had been interrupted at step 805, the supply is resumed.

This prevents a large drop in the NOx occluding capability that results when the SOx in the exhaust gas is occluded by the NOx occluding and reducing catalyst 20 which has a decreased NOx occluding capability.

Figure 9:
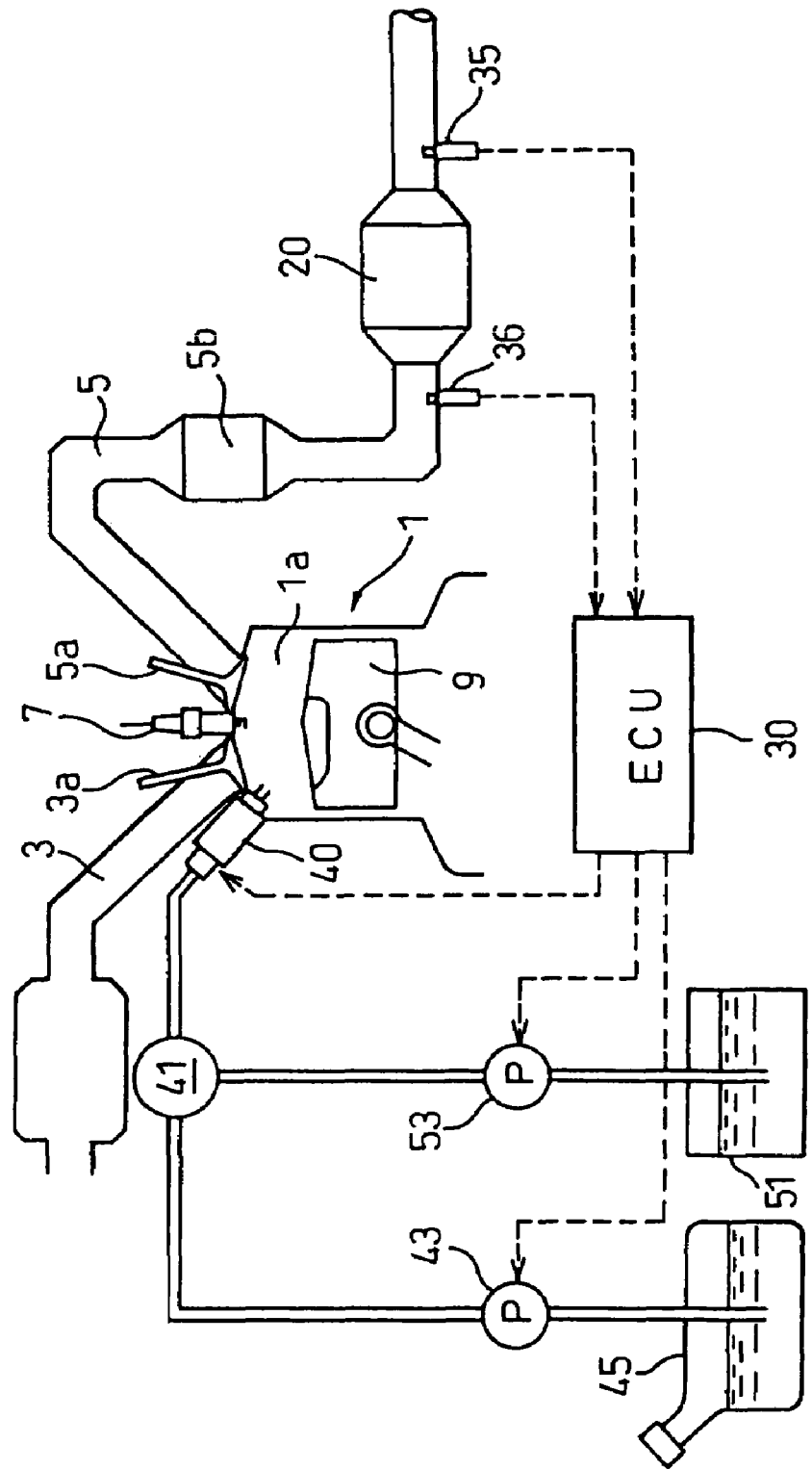
FIG. 9 is a diagram schematically illustrating the constitution of the apparatus according to a modified example of the third embodiment.

FIG. 9 is a diagram schematically illustrating the constitution of an apparatus for putting a modified example of the third embodiment into practice.

The apparatus of FIG. 9 is different from the apparatus of FIG. 7 with respect only to a NOx concentration sensor 36 disposed on the upstream of the NOx occluding and reducing catalyst 20 in addition to the one disposed downstream thereof.

In the embodiment of FIGS. 7 and 8, the NOx occluding capability of the NOx occluding and reducing catalyst 20 was determined based only upon the NOx concentration of the exhaust gas downstream of the NOx occluding and reducing catalyst 20.

The NOx occluding ability of the NOx occluding and reducing catalyst 20 is expressed as the amount (or ratio) of NOx occluded by the catalyst 20 out of the NOx in the exhaust gas that is flowing in. When the NOx occluding capability decreases, the NOx flows in an increased amount to the downstream without being occluded by the catalyst 20, and the NOx concentration increases in the exhaust gas on the downstream side. In the above-mentioned embodiment, therefore, the NOx concentration in the exhaust gas downstream of the catalyst 20 is used as an index of the NOx occluding capability of the catalyst 20. In practice, however, the NOx concentration in the exhaust gas downstream of the NOx occluding and reducing catalyst 20 is subject to be changed not only by the NOx occluding capability of the catalyst 20 but also by the NOx concentration in the exhaust gas flowing into the NOx occluding and reducing catalyst 20.

To correctly judge the NOx occluding capability of the NOx occluding and reducing catalyst 20, therefore, it is desired to take into consideration not only the NOx concentration in the exhaust gas downstream of the NOx occluding and reducing catalyst 20 but also the concentration of NOx in the exhaust gas on the upstream side.

In this embodiment, therefore, a value that serves as an index of the NOx occluding capability of the NOx occluding and reducing catalyst 20 is calculated by using the NOx concentration DNR downstream of the NOx occluding and reducing catalyst 20 detected by the NOx concentration sensor 35 and the NOx concentration UNR on the upstream of the NOx occluding and reducing catalyst 20 detected by the NOx concentration sensor 36.

As described above, the NOx occluding capability of the NOx occluding and reducing catalyst is expressed by what amount of NOx is occluded, by the catalyst 20, of the NOx in the exhaust gas flowing in. The amount of NOx occluded by the NOx occluding and reducing catalyst varies in proportion to, for example, the difference between the NOx concentration UNR on the upstream of the catalyst and the NOx concentration DNR on the downstream thereof. It is therefore allowable to use ΔNR=UNR−DNR as an index of NOx occluding capability of the NOx occluding and reducing catalyst 20.

Similarly, further, the NOx occluding capability can be defined as a ratio of the NOx amount occluded, by the catalyst 20, of the NOx in the exhaust gas flowing in. Accordingly, a ratio RNR=DNR/UNR of the NOx concentration DNR downstream of the catalyst to the NOx concentration UNR upstream thereof, may be used as an index of the NOx occluding capability.

Figure 10:
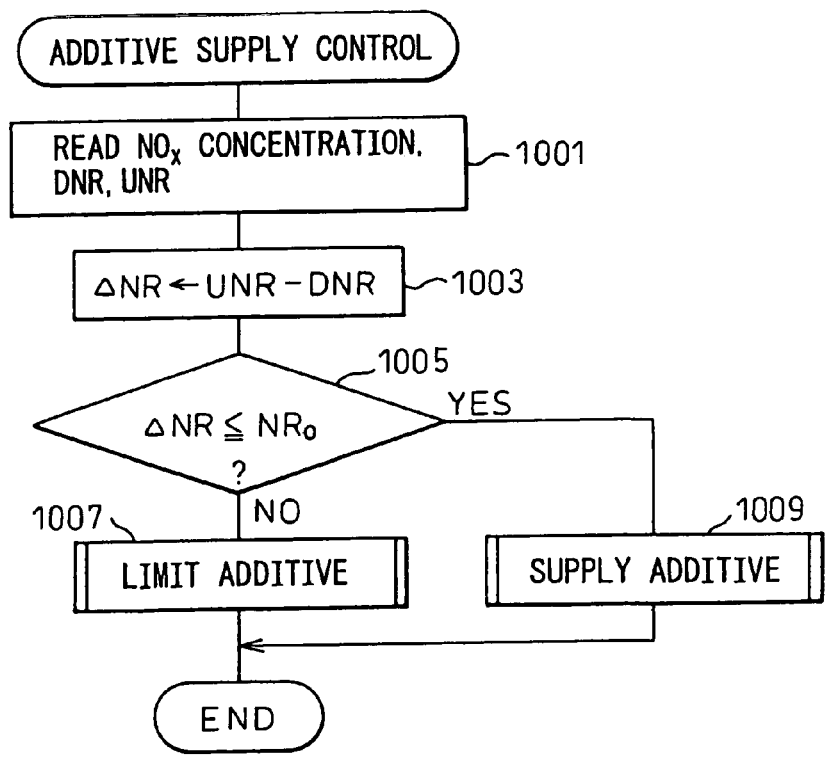
FIG. 10 is a flowchart for illustrating the additive supply control operation according to a modified example of the third embodiment.

FIG. 10 is a flowchart illustrating the additive supply control operation of when ΔNR is used as an index of the NOx occluding capability. This operation is executed by the ECU 30 at regular intervals.

In the operation of FIG. 10, the output UNR of the NOx concentration sensor 36 on the upstream side is read at step 1001 together with the output DNR of the NOx concentration sensor 35 on the downstream side, and a difference $\Delta NR$ between UNR and DNR is calculated at step 1003 as an index of the NOx occluding capability of the NOx occluding and reducing catalyst 20.

At step 1005, it is determined whether $\Delta NR$ has become smaller than a predetermined reference value $\Delta NR_0$. When $\Delta NR$ is greater than the reference value $\Delta NR_0$, it is considered that the NOx occluding capability of the NOx occluding and reducing catalyst 20 is still sufficiently large. Therefore, the routine proceeds to step 1007 where the supply of the additive is discontinued or the additive is supplied in a small amount to the engine 1.

When $\Delta NR \leq \Delta NR_0$ at step 1009, on the other hand, it is determined that the NOx occluding capability of the NOx occluding and reducing catalyst 20 has so decreased that little margin is left. In this case, therefore, the supply of the additive is increased or is resumed at step 1009.

This prevents a further large drop in the NOx occluding capability of the NOx occluding and reducing catalyst.

(4) Fourth Embodiment.

Next, a fourth embodiment of the present invention will be described.

In this embodiment, the supply of the sulfur-solidifying agent to the engine is controlled by using the device of the constitution shown in FIG. 1 from the standpoint of preventing the formation of deposit on the exhaust valves of the engine.

As described above, the sulfur-solidifying agent forms a metal sulfate upon reacting with the sulfur component in the fuel during the combustion. The sulfate assumes the form of solid particles at normal exhaust gas temperatures. Depending upon the conditions, therefore, the sulfate may deposit on the spark plugs, intake valves and exhaust valves to form a deposit. When the sulfate deposits on the intake valves and exhaust valves, the valves often malfunction, such as being poorly closed. Therefore, the formation of deposit must be suppressed as much as possible. Formation of the deposit varies depending upon the combustion temperature and the exhaust gas temperature of the engine, and further varies depending upon the engine operating conditions.

In this embodiment, therefore, when the engine is operated under a condition where the formation of deposit is promoted, the sulfur-solidifying agent is supplied to the engine in a decreased amount or is not supplied to prevent the deposition. Under a predetermined condition, further, the sulfur-solidifying agent is supplied to the engine in a decreased amount or is not supplied, thereby to decrease the consumption of the sulfur-solidifying agent and to prevent an increase in the formation of the particulate matter.

The sulfate formed by the reaction of the sulfur-solidifying agent with sulfur in the fuel is in the form of a gas being heated at a high temperature by the combustion. As the temperature of the combustion gas (exhaust gas) decreases, however, the gasified sulfate precipitates as a solid in the exhaust gas to form solid particles.

When the temperature of the exhaust gas is low while it is in the combustion chamber or while it is passing through the exhaust valve, therefore, the sulfate precipitates as solid particles on the exhaust valves to form a deposit. When the combustion temperature of the engine is low or when the engine temperature is low, therefore, the formation of deposit is promoted.

In this embodiment, therefore, when the engine is operated under a condition of promoting the formation of deposit, i.e., under the operating condition where the engine temperature and the combustion gas temperature are low, therefore, the sulfur-solidifying agent is supplied to the engine in a decreased amount or is not supplied, to suppress the formation of deposit.

Figure 11:
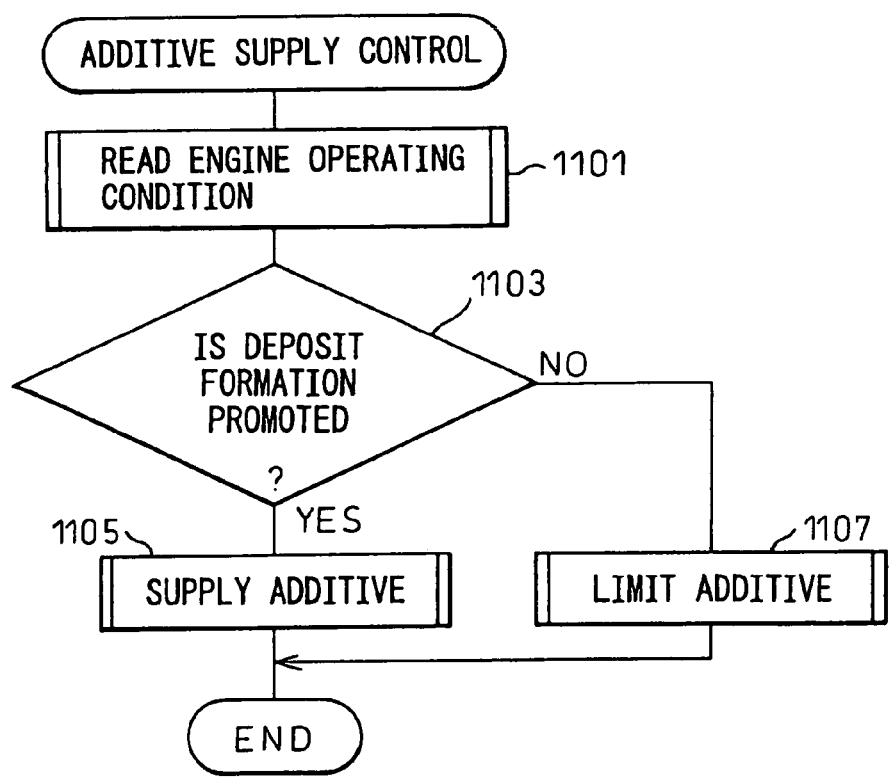
FIG. 11 is a flowchart illustrating a fourth embodiment of the additive supply control operation in the method of purifying exhaust gas according to the present invention.

FIG. 11 is a flowchart illustrating the additive supply control operation according to the embodiment. This operation is executed by the ECU 30 at regular intervals.

In the operation of FIG. 11, the data representing the engine operating condition are, first, read at step 1101. The data representing the engine operating condition referred to here are those related to, for example, the engine temperatures such as lubricating oil temperature, coolant temperature, load conditions (engine rotational speed, accelerator opening degree), etc., and the combustion gas (exhaust gas) temperature. These data are read from the corresponding sensors that are not shown.

At step 1103, it is determined, based on the data read at step 1101, whether the engine is now being operated under a condition of promoting the formation of deposit. As described above, the engine operating condition for promoting the formation of deposit is the one where the engine temperature and the combustion temperature are low, such as when the external air temperature is low, when the engine is cold-operated, when the engine is operated right after the cold start, when the engine is idling or when the operation is continued at a low speed carrying a light load.

When the engine is now operated at step 1103 under the condition of promoting the formation of deposit, the routine proceeds to step 1105 where the supply of the additive to the engine 1 is interrupted or the additive is supplied thereto in a decreased amount. Therefore, the formation of deposit is suppressed.

When the engine is not now operated at step 1103 under the condition of promoting the formation of deposit, the routine proceeds to step 1107 where the additive is supplied to the engine 1 in an amount greater than that at step 1105. Or, the supply is resumed when the supply had been interrupted at step 1105. This prevents the occlusion of SOx by the NOx occluding and reducing catalyst 20.

(5) Fifth Embodiment.

Next, a fifth embodiment of the present invention will be described.

In this embodiment, the supply of the sulfur-solidifying agent is controlled by using the apparatus of the constitution shown in FIG. 1 to suppress the occurrence of knocking in the engine.

The knocking occurs in the engine due to the pipe resonance caused by the self-ignition of the end gas in the cylinder. The knocking produces vibration and noise. The knocking that occurs to an excess degree causes damages to the spark plugs, valves and pistons in extreme cases.

The knocking tends to occur in the engines in which the ignition timings are advanced or the compression ratios are increased. In particular, the knocking tends to occur near the full load where the compression pressure becomes high.

The sulfur-solidifying agent added to the fuel does not affect the knocking when its amount is small but tends to cause the knocking when it is added in large amounts. Though the cause has not yet been clarified, it is presumed that the sulfur-solidifying agent added in large amounts to the fuel causes a drop in the concentration of high octane value components (e.g., iso-octane, etc.) in the fuel by the amount of the sulfur-solidifying agent and, hence, the octane value of the fuel decreases.

In this embodiment, it is determined whether the engine is now being operated in a region where the occurrence of knocking is promoted due to the sulfur-solidifying agent that is supplied. When the engine is operated in a region where the occurrence of knocking is promoted, the sulfur-solidifying agent is supplied to the engine in a decreased amount or is not supplied.

As described above, this embodiment suppresses the occurrence of knocking, decreases the consumption of the sulfur-solidifying agent, and suppresses the particulate matter from being formed in increased amounts.

Figure 12:
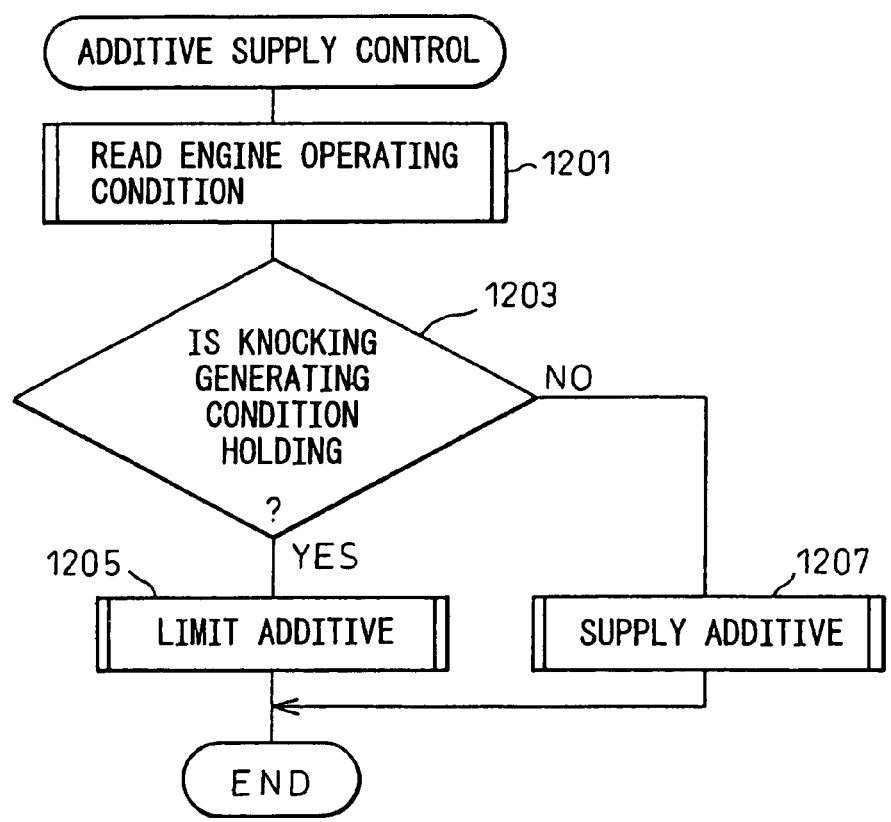
FIG. 12 is a flowchart illustrating a fifth embodiment of the additive supply control operation in the method of purifying exhaust gas according to the present invention.

FIG. 12 is a flowchart illustrating the additive supply control operation according to the embodiment. This operation is executed by the ECU 30 at regular intervals.

In the operation of FIG. 12, the data representing the engine operating condition are, first, read at step 1201. The data representing the engine operating condition referred to here are those related to the engine load, such as engine rotational speed, accelerator opening degree (the amount of depression of the accelerator pedal by the operator) and the ignition timing. These data are read by the corresponding sensors that are not shown.

Next, it is determined at step 1203 whether the engine is now being operated under a condition where the knocking easily occurs, i.e., in a state where the compression pressure in the cylinders is increased and the ignition timing is advanced, based on the data read at step 1201.

When the engine is now being operated at step 1203 under the condition where the knocking easily occurs, the sulfur-solidifying agent that is supplied to the engine may promote the occurrence of knocking. Therefore, the routine proceeds to step 1205 where the supply of additive to the engine 1 is interrupted or the additive is supplied thereto in a decreased amount. Thus, the occurrence of knocking is suppressed.

When the engine at step 1203 is not operated under the condition where the occurrence of knocking is promoted by the supply of the sulfur-solidifying agent, the routine proceeds to step 1207 where the amount of additive supplied to the engine 1 is increased to be larger than that at step 1205. Or, when the supply had been interrupted at step 1205, the supply is resumed. Thus, the occlusion of SOx by the NOx occluding and reducing catalyst 20 is prevented.

Figure 13:
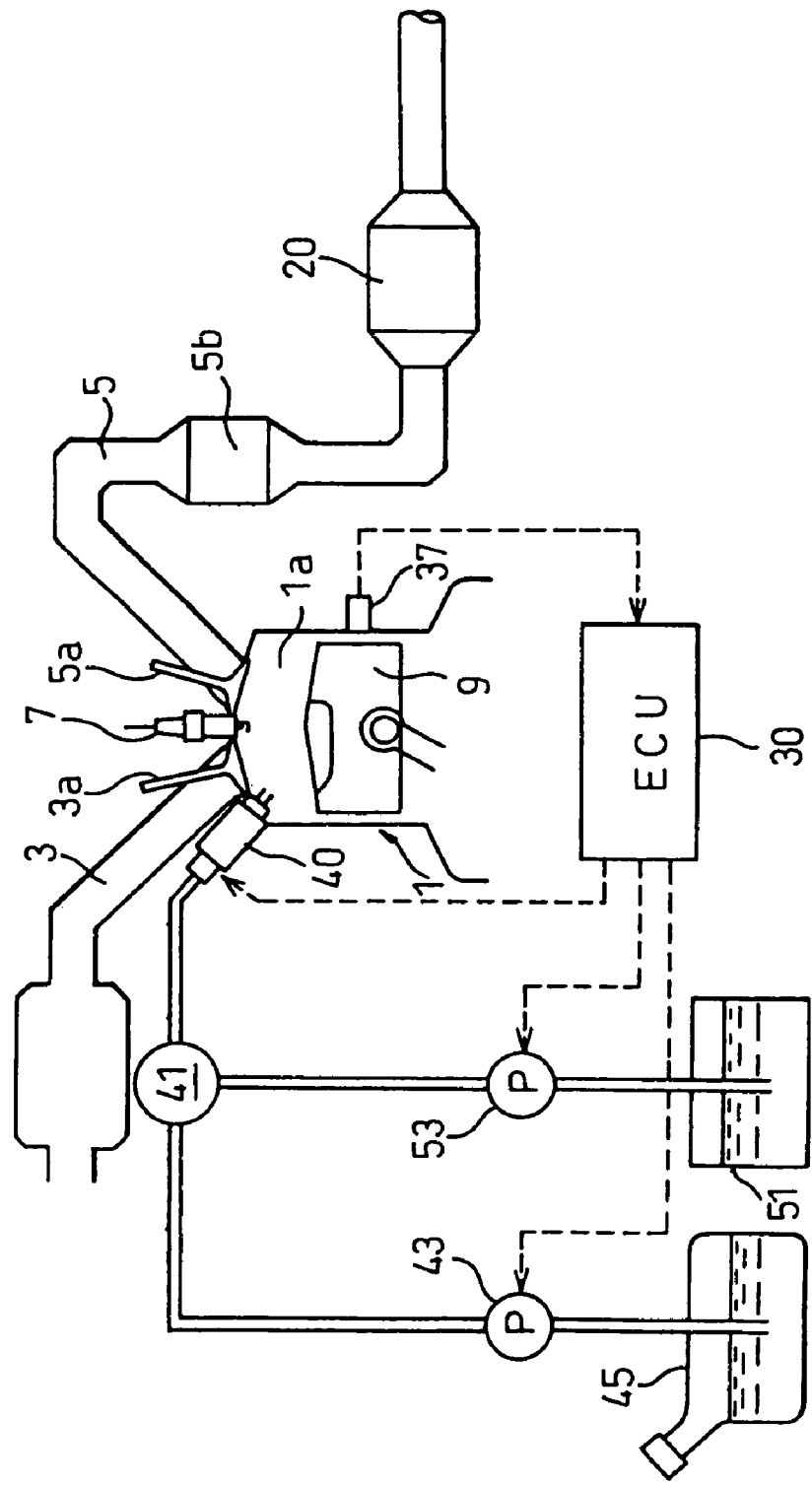
FIG. 13 is a diagram schematically illustrating the constitution of the apparatus according to a modified example of the fifth embodiment.

FIG. 13 is a diagram schematically illustrating the constitution of an apparatus according to a modified example of the fifth embodiment.

In FIG. 13, the same reference numerals as those of FIG. 1 denote the same elements as those of FIG. 1.

The apparatus of FIG. 13 is different from the apparatus of FIG. 1 with respect only to a knock sensor 37 provided on the cylinder block of the engine 1.

The knock sensor 37 is the one of the known type for detecting vibration in a frequency band specific to the knocking of the engines.

In the above-mentioned embodiment, the ECU 30 judges, based on the engine operating condition, whether the present engine operating condition is the one where the occurrence of knocking is promoted due to the sulfur-solidifying agent that is supplied, and supplies the sulfur-solidifying agent to the engine in a decreased amount or interrupts its supply to the engine when it is a condition for promoting the occurrence of knocking. However, the occurrence of knocking is affected by various conditions, and the occurrence of knocking is not necessarily judged correctly from the engine operating condition.

In this embodiment, therefore, whether the knocking is occurring is directly detected by using the knock sensor 37 instead of conducting the operation at step 1203 of FIG. 12, and the additive is supplied to the engine by the operation at step 1207 when the knocking is not occurring. When the knocking really occurrs, the operation of step 1205 is executed to decrease the amount of the additive supplied to the engine or to interrupt its supply.

Thus, knocking in the engine is more reliably suppressed.

In the above-mentioned embodiments, the additive containing a sulfur-solidifying agent is injected in a required amount into the common rail 1 by using the additive pump 53, and the sulfur-solidifying agent is injected into the combustion chamber from the fuel injector 40 in a state of being mixed with the fuel in the common rail. However, the method of the present invention is in no way limited thereto only. For example, each cylinder may be provided with a dedicated injector for injecting the additive into the combustion chamber in addition to the fuel injector 40, and the additive pressurized by the pump 53 may be directly injected into the combustion chamber.

According to the present invention, as explained above, the consumption of the sulfur-solidifying agent is decreased, and an increase in the formation of particulate matter is suppressed when the sulfur-solidifying agent is used for suppressing the sulfur contamination of the NOx occluding and reducing catalyst.

The invention claimed is:

1. A method of purifying exhaust gas of an internal combustion engine comprising steps of:

disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio; and causing said catalyst to occlude the NOx in the exhaust gas from the engine when the engine is operated at a lean air-fuel ratio, and purifying the NOx occluded by said catalyst by reduction with reducing components in the exhaust gas from said engine when the engine is operated at the stoichiometric air-fuel ratio or at the rich air-fuel ratio;

wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the condition of the atmosphere at said catalyst as detected by a sensor disposed in the exhaust gas passage downstream from the NOx occluding and reducing catalyst.

2. A method of purifying exhaust gas of an internal combustion engine as set forth in claim 1, wherein said sulfur-solidifying agent is supplied to the engine in a decreased amount or is not supplied when the condition of the atmosphere at said NOx occluding and reducing catalyst is one for suppressing the occlusion of SOx by the NOx occluding and reducing catalyst.

3. A method of purifying exhaust gas of an internal combustion engine as set forth in claim 1, wherein said sulfur-solidifying agent is supplied to the engine in a decreased amount or is not supplied when the condition of the atmosphere of said NOx occluding and reducing catalyst is one for promoting the SOx occluded by the NOx occluding and reducing catalyst to be released from the NOx occluding and reducing catalyst.

4. The method of purifying exhaust gas of an internal combustion engine as set forth in claim 1, wherein the sensor detects an air-fuel ratio of the exhaust gas based on the oxygen concentration in the exhaust gas.

5. The method of purifying exhaust gas of an internal combustion engine as set forth in claim 1, wherein the sensor detects an exhaust gas temperature.

6. The method of purifying exhaust gas of an internal combustion engine as set forth in claim 1, wherein the sensor detects the NOx concentration of the exhaust gas.

7. A method of purifying exhaust gas of an internal combustion engine comprising steps of:
  disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio; and
  causing said catalyst to occlude the NOx in the exhaust gas from the engine when the engine is operated at a lean air-fuel ratio, and purifying the NOx occluded by said catalyst by reduction with reducing components in the exhaust gas from said engine when the engine is operated at the stoichiometric air-fuel ratio or at the rich air-fuel ratio;
  wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the operating condition of the engine, and
  wherein said sulfur-solidifying agent is supplied to the engine in a decreased amount or is not supplied when said internal combustion engine is operated under a condition of suppressing the occlusion of SOx by the NOx occluding and reducing catalyst.

8. A method of purifying exhaust gas of an internal combustion engine comprising steps of:
  disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio; and
  causing said catalyst to occlude the NOx in the exhaust gas from the engine when the engine is operated at a lean air-fuel ratio, and purifying the NOx occluded by said catalyst by reduction with reducing components in the exhaust gas from said engine when the engine is operated at the stoichiometric air-fuel ratio or at the rich air-fuel ratio;
  wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the operating condition of the engine, and
  wherein said sulfur-solidifying agent is supplied to the engine in a decreased amount or is not supplied when said internal combustion engine is operated under a condition of promoting the SOx occluded by the NOx occluding and reducing catalyst to be released from the NOx occluding and reducing catalyst.

9. A method of purifying exhaust gas of an internal combustion engine comprising steps of:
  disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio; and
  causing said catalyst to occlude the NOx in the exhaust gas from the engine when the engine is operated at a lean air-fuel ratio, and purifying the NOx occluded by said catalyst by reduction with reducing components in the exhaust gas from said engine when the engine is operated at the stoichiometric air-fuel ratio or at the rich air-fuel ratio;
  wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the operating condition of the engine, and
  wherein said sulfur-solidifying agent is supplied to the engine in a decreased amount or is not supplied when said internal combustion engine is operated under a condition of promoting the formation of deposit in the engine due to said sulfur-solidifying agent.

10. A method of purifying exhaust gas of an internal combustion engine comprising steps of:
  disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio; and
  causing said catalyst to occlude the NOx in the exhaust gas from the engine when the engine is operated at a lean air-fuel ratio, and purifying the NOx occluded by said catalyst by reduction with reducing components in the exhaust gas from said engine when the engine is operated at the stoichiometric air-fuel ratio or at the rich air-fuel ratio;
  wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the operating condition of the engine, and wherein said sulfur-solidifying agent is supplied to the engine in a decreased amount or is not supplied when said internal combustion engine is operated under a condition of promoting the occurrence of knocking due to the addition of said sulfur-solidifying agent.

11. A method of purifying exhaust gas of an internal combustion engine comprising steps of:

disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio; and causing said catalyst to occlude the NOx in the exhaust gas from the engine when the engine is operated at a lean air-fuel ratio, and purifying the NOx occluded by said catalyst by reduction with reducing components in the exhaust gas from said engine when the engine is operated at the stoichiometric air-fuel ratio or at the rich air-fuel ratio;

wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the operating condition of the engine, and wherein said sulfur-solidifying agent is supplied to the engine in a decreased amount or is not supplied when the knocking has occurred in said internal combustion engine.

12. A method of purifying exhaust gas of an internal combustion engine comprising steps of:

disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio; and causing said catalyst to occlude the NOx in the exhaust gas from the engine when the engine is operated at a lean air-fuel ratio, and purifying the NOx occluded by said catalyst by reduction with reducing components in the exhaust gas from said engine when the engine is operated at the stoichiometric air-fuel ratio or at the rich air-fuel ratio;

wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the NOx occluding capability of said NOx occluding and reducing catalyst.

13. A method of purifying exhaust gas of an internal combustion engine as set forth in claim 12, wherein when the NOx occluding capability of said NOx occluding and reducing catalyst becomes lower than a predetermined value, said sulfur-solidifying agent is supplied to the engine in an increased amount or the supply thereof is started.

14. The method of purifying exhaust gas of an internal combustion engine as set forth in claim 12, wherein the NOx occluding capability of the NOx occluding and reducing catalyst is detected by a sensor.

15. A method of purifying exhaust gas of an internal combustion engine comprising steps of:

disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio; and causing said catalyst to occlude the NOx in the exhaust gas from the engine when the engine is operated at a lean air-fuel ratio, and purifying the NOx occluded by said catalyst by reduction with reducing components in the exhaust gas from said engine when the engine is operated at the stoichiometric air-fuel ratio or at the rich air-fuel ratio;

wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the condition of the atmosphere at said catalyst, and wherein said sulfur-solidifying agent is supplied to the engine in a decreased amount or is not supplied when the condition of the atmosphere at said NOx occluding and reducing catalyst is one for suppressing the occlusion of SOx by the NOx occluding and reducing catalyst.

16. A method of purifying exhaust gas of an internal combustion engine comprising steps of:

disposing a NOx occluding and reducing catalyst in an exhaust gas passage of the internal combustion engine to selectively occlude and hold NOx in the exhaust gas by adsorption, by absorption or by both of them when the air-fuel ratio of the exhaust gas flowing in is lean, and to reduce the occluded NOx with reducing components in the exhaust gas when the air-fuel ratio of the exhaust gas flowing in becomes the stoichiometric air-fuel ratio or a rich air-fuel ratio; and causing said catalyst to occlude the NOx in the exhaust gas from the engine when the engine is operated at a lean air-fuel ratio, and purifying the NOx occluded by said catalyst by reduction with reducing components in the exhaust gas from said engine when the engine is operated at the stoichiometric air-fuel ratio or at the rich air-fuel ratio;

wherein a sulfur-solidifying agent that forms a solid sulfate upon the reaction with SOx at the time of combustion is supplied to the engine to solidify the SOx in the exhaust gas thereby to prevent the SOx in the exhaust gas from being occluded by the NOx occluding and reducing catalyst, and the amount of supplying said sulfur-solidifying agent to the engine is controlled depending upon the condition of the atmosphere at said catalyst, and wherein said sulfur-solidifying agent is supplied to the engine in a decreased amount or is not supplied when the condition of the atmosphere of said NOx occluding and reducing catalyst is one for promoting the SOx occluded by the NOx occluding and reducing catalyst to be released from the NOx occluding and reducing catalyst.

* * * * *